US008416298B2

United States Patent
Pechatnikov

(10) Patent No.: US 8,416,298 B2
(45) Date of Patent: Apr. 9, 2013

(54) METHOD AND SYSTEM TO PERFORM OPTICAL MOVING OBJECT DETECTION AND TRACKING OVER A WIDE AREA

(75) Inventor: Michael Pechatnikov, Tel Aviv (IL)

(73) Assignee: Visionmap Ltd., Tel Aviv (IL)

( * ) Notice: Subject to any disclaimer, the term of this patent is extended or adjusted under 35 U.S.C. 154(b) by 0 days.

(21) Appl. No.: 12/514,468

(22) PCT Filed: Aug. 7, 2008

(86) PCT No.: PCT/IL2008/001085
§ 371 (c)(1),
(2), (4) Date: May 12, 2009

(87) PCT Pub. No.: WO2009/019695
PCT Pub. Date: Feb. 12, 2009

(65) Prior Publication Data
US 2010/0157055 A1   Jun. 24, 2010

Related U.S. Application Data

(60) Provisional application No. 60/954,366, filed on Aug. 7, 2007.

(51) Int. Cl.
*H04N 7/18* (2006.01)
(52) U.S. Cl. ........ 348/144; 348/117; 348/145; 348/146; 348/147
(58) Field of Classification Search .................. 348/117, 348/144, 145, 146, 147
See application file for complete search history.

(56) References Cited

U.S. PATENT DOCUMENTS

| | | | | |
|---|---|---|---|---|
| 5,473,364 A * | 12/1995 | Burt | ................................ | 348/47 |
| 5,798,786 A * | 8/1998 | Lareau et al. | .................. | 348/144 |
| 6,990,406 B2 * | 1/2006 | Fink et al. | ..................... | 701/117 |
| 7,697,725 B2 * | 4/2010 | Burns et al. | .................... | 382/107 |
| 2001/0026316 A1 * | 10/2001 | Senatore | ....................... | 348/148 |
| 2005/0004759 A1 | 1/2005 | Siegel | | |
| 2006/0114325 A1 * | 6/2006 | von Hausen | ................... | 348/144 |
| 2007/0093945 A1 | 4/2007 | Grzywna et al. | | |
| 2007/0116118 A1 | 5/2007 | Kostrzewski et al. | | |
| 2008/0267451 A1 * | 10/2008 | Karazi | .......................... | 382/103 |
| 2009/0015674 A1 * | 1/2009 | Alley et al. | .................... | 348/144 |
| 2009/0157233 A1 * | 6/2009 | Kokkeby et al. | .................. | 701/3 |
| 2010/0002077 A1 * | 1/2010 | Viggiano et al. | ............... | 348/115 |
| 2010/0026802 A1 * | 2/2010 | Titus et al. | ..................... | 348/143 |

FOREIGN PATENT DOCUMENTS

| | | |
|---|---|---|
| EP | 0423984 | 10/1990 |
| WO | WO0046985 | 8/2000 |
| WO | WO 0046985 A1 * | 8/2000 |
| WO | WO2006137071 | 12/2006 |

* cited by examiner

*Primary Examiner* — Tammy Nguyen
*Assistant Examiner* — Jonathan Bui
(74) *Attorney, Agent, or Firm* — Mark M. Friedman

(57) ABSTRACT

A method for moving object detection, comprising generating a time series of multi-exposures of scenes, each multi-exposure of a scene comprising a sequence of at least two at least partially overlapping images of that scene captured in rapid succession, wherein the time series of multi-exposures periodically revisits substantially the same scenes, detecting moving objects within each multi-exposure by comparing its sequence of overlapping images, and tracking objects by comparing moving objects detected within multi-exposures of substantially the same scenes.

13 Claims, 4 Drawing Sheets

METHOD AND SYSTEM TO PERFORM OPTICAL MOVING OBJECT DETECTION AND TRACKING OVER A WIDE AREA

RELATED APPLICATIONS

This application is a National Phase Application of PCT/IL2008/001085 filed on Aug. 7, 2008, and also claims the benefit under 119(e) of U.S. Provisional Patent Application No. 60/954,366 filed Aug. 7, 2007, the contents of which are incorporated herein by reference.

PRIORITY REFERENCE TO RELATED APPLICATIONS

This application claims benefit of U.S. Provisional Application No. 60/954,366, entitled METHOD AND SYSTEM TO PERFORM OPTICAL MOVING TARGET AND CHANGE DETECTION INDICATION, filed on Aug. 7, 2007 by inventor Michael Pechatnikov. This application is a continuation-in-part of pending U.S. application Ser. No. 11/607,511 entitled DIGITAL MAPPING SYSTEM BASED ON CONTINUOUS SCANNING LINE OF SIGHT, filed on Nov. 30, 2006.

FIELD OF THE INVENTION

The field of the subject invention is reconnaissance and surveillance systems. More specifically, the subject invention relates to wide area persistent monitoring systems.

BACKGROUND OF THE INVENTION

Moving object detection and change detection is a well-researched field, with many applications in the security and surveillance domain. Moving object and change detection systems are required to provide automated, robust and real-time detection of moving objects with a high probability of success and a minimal rate of false alarms, without labor-intensive intervention.

Conventional moving object detection and tracking systems are of two generic types; namely, real-time systems and off-line systems. Real-time systems use static low-resolution video cameras, typically HDTV or lower resolution. These video cameras track a pre-designated area, typically limited in size due to the inherent trade-off between field of view and ground sampling distance. Real-time systems generally provide acceptable probabilities of detection, but cover small areas; e.g., an area of 100 m×200 m at 10 cm resolution.

Off-line systems are used to detect changes over longer periods of time and over wider areas than real-time systems. Off-line systems typically operate by comparing satellite or other aerial imagery over time periods ranging from several hours to several months or even years. Off-line systems detect different levels of change than do real-time systems, such as infrastructure changes, which are largely irrelevant to real-time decision making. In addition off-line systems lack robustness with respect to viewing angle, lighting conditions, and other factors.

Robust motion detection generally requires capture of two partially overlapping image frames with substantially similar lighting conditions and perspective. Localization of moving objects in two frames requires the revisit time to be sufficiently short, e.g., less than 0.5 sec, in order to maintain close distances between objects in both image frames. Revisit times that are too short, e.g., less than 0.1 sec, may hide differences between two frames, and prevent calculation of motion parameters. As such, a desirable range for revisit times is 0.1-0.5 sec.

However continuous monitoring of a wide area is practically impossible if a revisit time of 0.1-0.5 sec is to be maintained over the entire area. Typically, revisit times for coverage of a larger area are in the range of 5-120 sec.

There is currently no system that provides real-time moving object detection over wide areas using optical sensors.

SUMMARY OF THE DESCRIPTION

Aspects of the subject invention provide novel methods and systems for real-time object detection and tracking over wide areas of coverage, by combining motion detection and estimation derived from short revisit times with coverage of wide areas over longer revisit times. The short revisit times correspond to a rapid sequence of two or more at least partially overlapping images, which is referred to herein as a "multi-exposure." For the case of two images, the sequence is referred to herein as a "double exposure".

In accordance with embodiments of the subject invention, motion detection is performed on images of a multi-exposure. Additionally, velocity estimation is performed on the images of the multi-exposure, in order to localize objects in multi-exposures that cover substantially the same area. The images of a multi-exposure have substantially the same environmental conditions, including inter alia angle of view and lighting. As such, motion detection and velocity estimation based on multi-exposures provide robust and reliable position and velocity data, using simple real-time computational image processing.

Embodiments of the subject invention are able to monitor small objects within wide areas, by mounting a camera and processing assembly on board an aircraft, or such other airborne vehicle including inter alia a balloon, a stratospheric airship and an unmanned aerial vehicle (UAV).

The areas monitored by embodiments of the subject invention are typically metropolitan areas. Images acquired of these areas contain objects at different elevations, such as objects on roof tops and objects on streets, with different perspective responses to camera movement. Such differences generally result in unacceptable levels of false alarms by conventional moving object detection algorithms.

Tracking of moving objects in built-up metropolitan areas requires short revisit periods. To capture high resolution images over short revisit periods requires enormous capture rates and pixel processing rates, in order to cover an area of interest. The total amount of data collected is too large to be transmitted to a ground station. As such, on-board processing is used, in order to extract and transmit only essential moving object data.

Embodiments of the present invention apply to a wide spectrum of signals. For ease of understanding, the present description relates to UV, visible, near IR and IR signals. The sensor device for these signals is referred to herein generically as a "camera".

Embodiments of the present invention are of advantage in many applications, including inter alia reconnaissance and surveillance, traffic surveillance and law enforcement. Reconnaissance and surveillance systems of the present invention automatically detect, transmit and track moving objects in a wide area, thus providing useful tactical information.

Traffic surveillance is performed by mounting systems of the present invention inter alia on a balloon, on a UAV or on a stratospheric airship. Such systems automatically provide useful real-time traffic information, as well as information about illegal driving and other traffic-related violations.

Law enforcement is performed by mounting systems of the present invention inter alia on a balloon, on a UAV or on a stratospheric airship. Such systems enable law enforcement agencies to investigate events post-priori, and determine which vehicles or persons arrived at a crime location, from where, and at what time.

There is thus provided in accordance with an embodiment of the subject invention a method for moving object detection, including generating a time series of multi-exposures of scenes, each multi-exposure of a scene including a sequence of at least two at least partially overlapping images of that scene captured in rapid succession, wherein the time series of multi-exposures periodically revisits substantially the same scenes, detecting moving objects within each multi-exposure by comparing its sequence of overlapping images, and tracking objects by comparing moving objects detected within multi-exposures of substantially the same scenes.

There is additionally provided in accordance with an embodiment of the present invention a moving object detection system, including an airborne segment, including at least one camera for capturing images of scenes, a moving object detector coupled with the at least one camera, for receiving as input images of a scene, and for deriving as output information about moving objects detected in the scene, and an airborne controller coupled with the moving object detector for receiving control commands from a ground segment, and for controlling operation of the moving object detector in response to the received commands, a ground segment, including an object tracker for receiving as input information about moving objects, and for deriving as output tracking information about the moving objects, and a ground controller coupled with the object tracker for issuing control commands to the airborne segment, and for receiving information about moving objects from the airborne segment in response to the control commands, and a communication link for transmitting data between the airborne controller and the ground controller.

There is further provided in accordance with an embodiment of the subject invention a moving object detection system, including an optical unit including at least one camera for capturing images of scenes, an airborne electronics unit including a controller coupled with the optical unit for controlling fields of view and image capture times of the at least one camera, wherein the controller controls the at least one camera to capture a time series of multi-exposures of scenes, each multi-exposure of a scene comprising a sequence of at least two at least partially overlapping images of that scene captured in rapid succession, wherein the time series of multi-exposures periodically revisits substantially the same scenes, and a moving object detector coupled with the optical unit for detecting moving objects within each multi-exposure by comparing its sequence of overlapping images, and a ground processing unit communicatively coupled with the first electronics unit for tracking objects by comparing moving objects detected within multi-exposures of substantially the same scenes.

BRIEF DESCRIPTION OF THE DRAWINGS

The subject invention will be more fully understood and appreciated from the following detailed description, taken in conjunction with the drawings in which.

DETAILED DESCRIPTION

Embodiments of the subject invention concern methods and systems for automated real-time moving object detection and tracking over very wide areas using non-static cameras.

Figure 1:
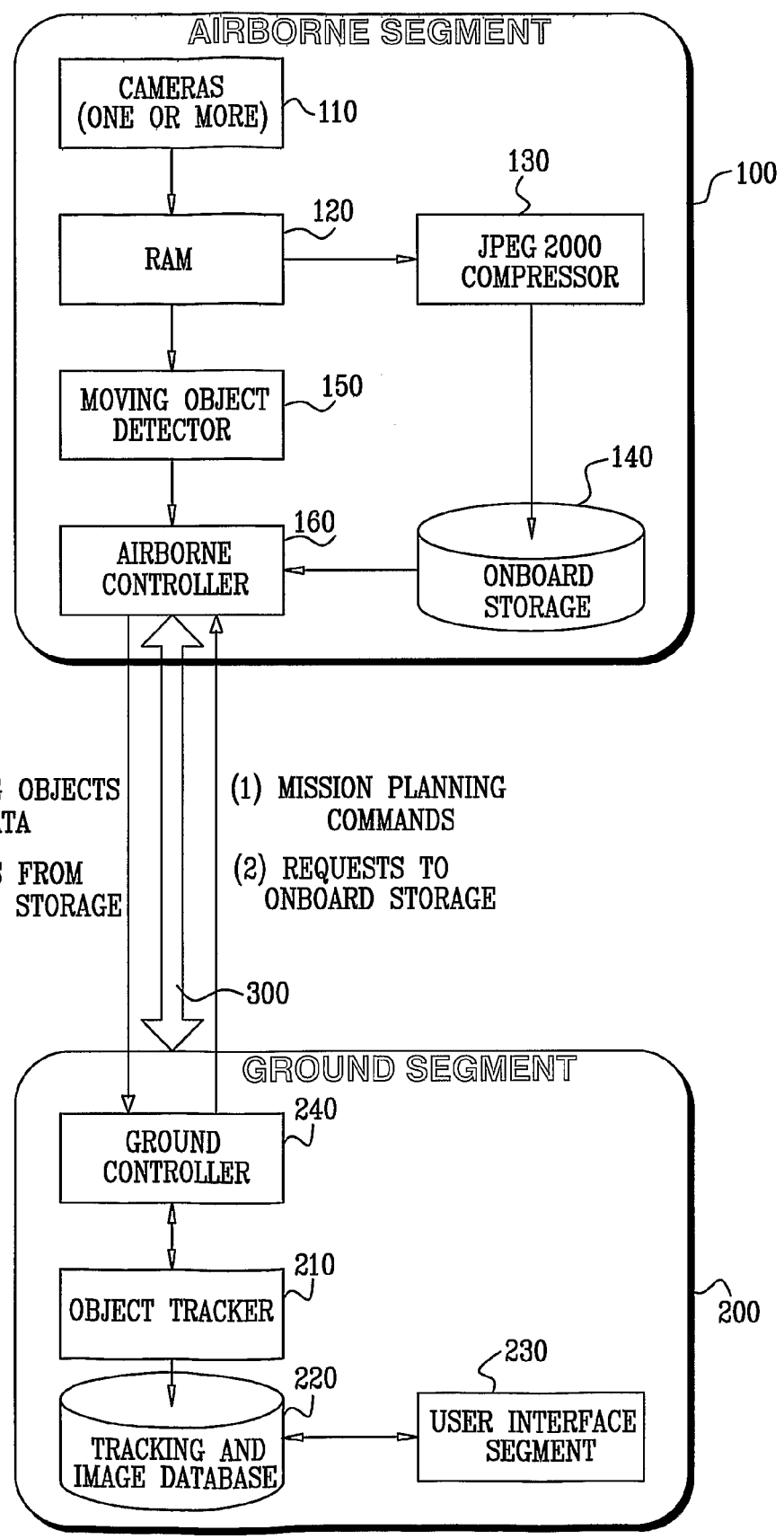
FIG. 1 is a simplified block diagram of a system for moving object detection and tracking over a wide area, in accordance with an embodiment of the present invention.

Reference is now made to FIG. 1, which is a simplified block diagram of a system for moving object detection and tracking over a wide area, in accordance with an embodiment of the present invention. Shown in FIG. 1 is an airborne segment 100, which is operative on board an aerial platform to capture images, to process the captured images to detect moving objects, and to generate moving object data. Counterpart to the airborne unit is a ground segment 200, which is operative at a ground station to issue mission commands and requests to airborne unit 100, to process moving object data generated by airborne segment 100, and track the moving objects.

Airborne segment 100 includes one or more cameras 110, and RAM memory 120 for temporarily storing raw image data, an optional JPEG2000 compressor 130 for compressing raw image data, or such other image compressor, and an onboard storage unit 140 for storing compressed image data. Airborne segment 100 also includes a moving object detector 150, for processing image data to detect moving objects within the images. Components of airborne segment 100 are controlled by an airborne controller 160.

Ground segment 200 includes an object tracker 210, for tracking objects detected by moving object detector 150. Ground segment 200 also includes a tracking and image database 220 for storing tracked object data, and a user interface 230 for interactively accessing tracking and image database 220. Components of ground segment 200 are controlled by a ground controller 240.

Airborne controller 140 and ground controller 240 communicate back and forth with one another via a communication link 300. Airborne controller 140 receives mission planning commands, and requests to onboard storage 140 from ground controller 240. In response, airborne controller 140 transmits moving object data generated by moving object detector 150, and image data form onboard storage 140 to ground controller 240.

In an alternative embodiment of the subject invention, communication link 300 is not used. Instead, data is stored on board airborne segment 100 for off-line processing.

Prior art object detection and tracking systems use two-dimensional imaging algorithms. Such systems do not perform well with dynamic sensors, since differences in perspective cause static objects to appear as moving. Generally, when images are captured by non-static sensors, prior art systems have unacceptable levels of false alarms.

In distinction, methods embodying the present invention use photogrammetry and computer vision to reconstruct a three-dimensional scene in real-time. These methods distinguish between moving objects and static objects, even when sensor movements cause perspective discrepancies in the images.

Methods embodying the present invention use photogrammetric relative solve of images. Specifically, for substantially every pixel in a source image, a corresponding epi-polar line is defined in a destination image. Specific pixels in the destination image are selected, and if a corresponding object in the source image is not in its epi-polar line, or sufficiently far from an initial estimate of its epi-polar line, then the object is deemed to be a moving object. By using multi-exposures, taken over short time intervals, the methods of the present invention perform robustly.

Due to the short time spans between images in a multi-exposure, the change of perspective between images is relatively small. Consider, for example, an aircraft flying at an altitude of H=2500 m, and at a speed of v=50 m/sec. Suppose the onboard camera has a time span of t=0.2 sec between successive images within a multi-exposure. For a building of height h=50 m, the change in perspective of the building between successive images is given by $$P = h*t*v/H = 0.2 \text{ m},$$

For a camera with a ground sampling distance of 10 cm/pixel, such change in perspective corresponds to 2 pixels, which is relatively small.

In one embodiment of the present invention, cameras 110 shown in FIG. 1 use mirror-based folding lenses to reduce the size of an optical assembly while maintaining required focal lengths. Mirror-based lenses require only simple motors for rotation. Additional details regarding cameras 110 and their optical units are described in applicant's co-pending application, U.S. Ser. No. 11/607,511 filed on Nov. 30, 2006, and entitled DIGITAL MAPPING SYSTEM BASED ON CONTINUOUS SCANNING LINE OF SIGHT, the contents of which are hereby incorporated herein by reference.

In accordance with an embodiment of the subject invention, motion compensation is performed by tilting a mirror mounted on the folding optics, using a piezoelectric tilt platform. Since the weight and size of the mirror are small, motion compensation is accurate.

It will be appreciated by those skilled in the art that non-mirror based optics may alternatively be used in other embodiments of the subject invention.

Further in accordance with embodiments of the present invention, moving object detection is performed by acquiring a rapid sequence of two or more images within a short time span, such as a 0.1-0.5 sec. delay. The rapid sequence of images is referred to herein as a multi-exposure. Partial overlap between images enables motion detection. Notationally, the system of FIG. 1 captures successive a time series of multi-exposures $M_1, M_2, M_3, \ldots$, where each multi-exposure, $M_k$, is a sequence of $m_k$ images $$M_k = (I_{k1}, I_{k2}, \ldots, I_{k\,mk}).$$

The multi-exposures are substantially periodic, with a revisit period, p. I.e., over each time interval p the multi-exposures capture substantially the same scenes. The images within each multi-exposure are captured rapidly, typically within a delay 0.1-0.5 sec. between images, and the revisit period, p is generally on the order of 5-120 sec.

Figure 2:
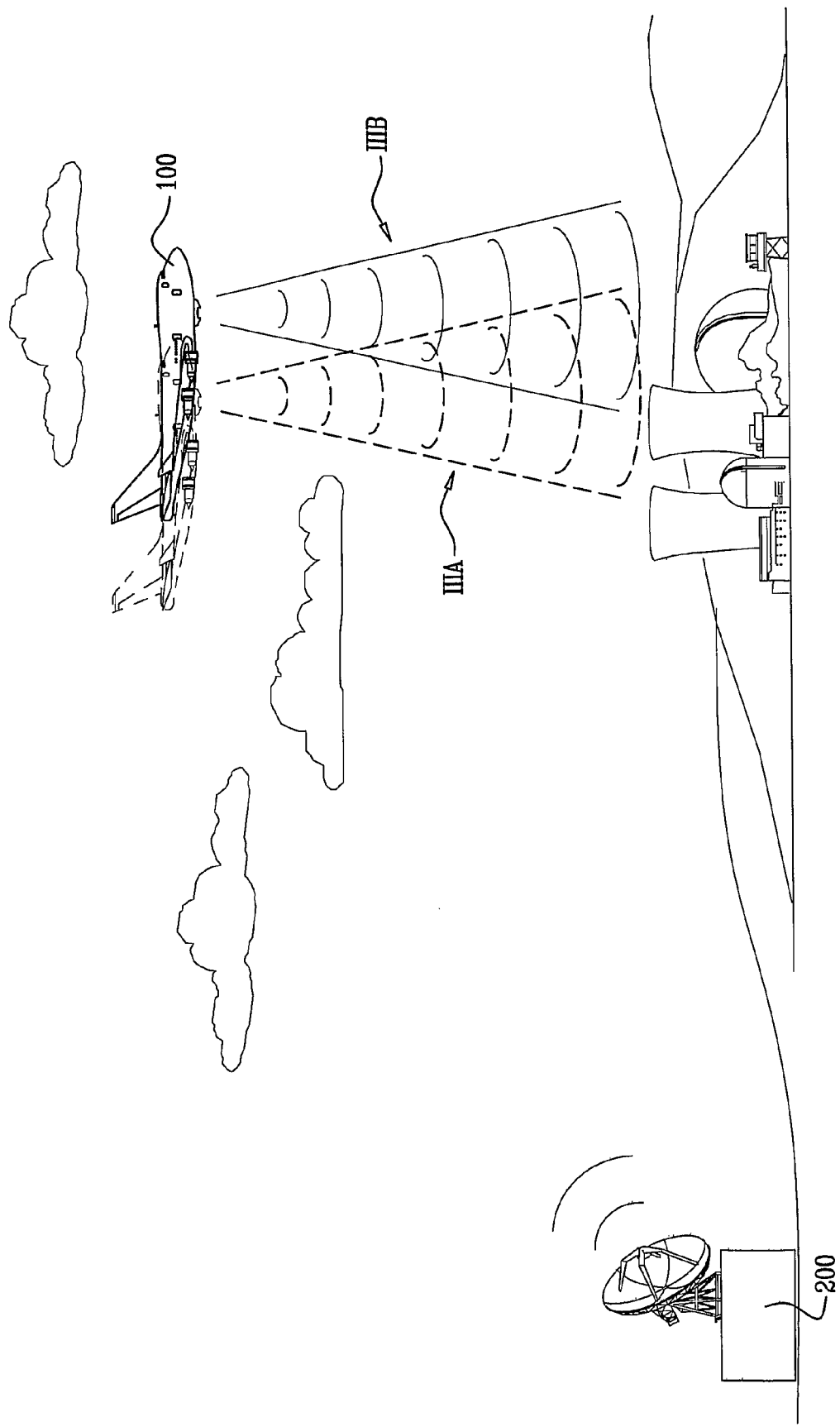
FIG. 2 is an illustration of a camera capturing images from two fields of view in rapid succession, from an airborne segment in flight, and the airborne segment transmitting derived moving object data to a ground segment, in accordance with an embodiment of the present invention.

Reference is now made to FIG. 2, which is an illustration of a camera capturing images from two fields of view in rapid succession, from airborne segment 100 in flight, and airborne segment 100 transmitting derived moving object data to ground segment 200, in accordance with an embodiment of the present invention.

Figure 3A:
FIGS. 3A and 3B are illustrations of a rapid double-exposure sequence of images captured by a camera corresponding to the fields of view shown in FIG. 2, in accordance with an embodiment of the present invention.
Figure 3B:

Reference is further made to FIGS. 3A and 3B, which are illustrations of the rapid double-exposure sequence of images captured by camera 110 corresponding to the fields of view shown in FIG. 2, in accordance with an embodiment of the present invention.

It will be appreciated by those skilled in the art that embodiments of the present invention allow for trade-off of coverage area and revisit period. The larger the coverage area, the larger is the revisit period. Area of coverage is determined by the flight path of an aircraft 400 transporting cameras 110, and by the angles through which the camera gimbals swing. It will be appreciated by those skilled in the art that other means may be used instead to control the line-of-sight of cameras 110, in accordance with other embodiments of the subject invention.

Using a gimbal controlled by controller 160, or such other means to control the line-of-sight of cameras 110, the trade-off between revisit period and coverage area is adjusted according to an adaptable flight plan.

Accuracy of change estimation is determined by ground sampling distance (GSD) and the delay time between image capture in the multi-exposure sequence. E.g., if the GSD is 10 cm, and the delay time between image frames is 0.2 sec, then objects moving at 1.8 km/h or faster are detectable.

Embodiments of the present invention perform real-time tracking of objects. For tracking purposes, sampling of moving objects is done with a revisit period generally between 5 sec and 120 sec per cycle. The revisit period is controlled by programming a scan pattern to allow for frequent acquisition of multi-exposure sequences. Generally, if an object is moving within one multi-exposure, then it will be moving in the successive multi-exposure as well. As such, tracking is performed by matching of moving objects between two consecutive multi-exposures. When an object starts or stops moving, it is searched for within a static region of imagery.

In accordance with embodiments of the present invention, wireless communication is used to transmit real-time data generated within an airborne vehicle to a ground station. Since the pixel collection rate of the systems is high, it is impractical to transmit all of the image data to the ground station. Instead, moving object detector 150 performs computer algorithms for moving object detection onboard the aircraft. After the object motion detection is computed onboard, only data about the moving objects that are detected is sent to the ground station. The transmitted data is organized in records, each record including an object number, a thumbnail representation of the detected object, the object's X, Y and azimuth coordinates, and the time of detection. As such, the required bandwidth is reduced substantially.

A double-exposure sequence may be implemented in several ways. In one implementation, two independently gimbaled cameras are used, where the cameras substantially cover the same areas with slight delays. In another implementation, two cameras are mounted on the same gimbals with specific angles, so that the second camera covers substantially the same areas as the first camera, with a slight delay. In another implementation, a single camera is used, the camera covering an area with a designated trajectory. In another implementation, a single camera is used, which captures several images per second and maintains significant overlap, such as 50% overlap, between successive images.

Use of two cameras, as described hereinabove, enables coverage of a larger area than one camera covers. In general, any number of cameras may be used, as necessary for achieving specific mission requirements.

It will be appreciated by those skilled in the art that embodiments of the present invention afford several advantages over prior art systems, including inter alia:

1. the ability to automatically detect moving objects within densely built-up areas, including inter alia people, and small vehicles;
2. the ability to survey wide areas accurately; and
3. the ability to detect objects moving at speeds ranging from 2 km/h to 140 km/h.

In distinction, for a representative revisit time of 5 sec, prior art systems are typically able to monitor only 1/1000 of the area that is monitored by embodiments of the present invention.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for moving object detection, comprising:
   in an airborne vehicle:
   (a) generating a time series of multi-exposures of scenes, each multi-exposure of a scene comprising a sequence of at least two at least partially overlapping images of that scene captured in rapid succession, wherein the time series of multi-exposures periodically revisits substantially the same scenes;
   (b) detecting moving objects within each multi-exposure by comparing its sequence of overlapping images;
   (c) generating data characterizing the moving objects; and
   (d) transmitting only the data characterizing the moving objects to a ground station; and
   in said ground station:
   (e) based on the data characterizing the moving objects, tracking the moving objects;
   wherein the data characterizing the moving objects comprises, for each moving object, a capture time, object location coordinates, an object velocity vector, and a thumbnail image of the object.

2. The method of claim 1 wherein the at least two overlapping images of the scene are captured within time intervals of 0.1-0.5 sec.

3. The method of claim 1 wherein the time series of multi-exposures revisits the same scene with a revisit period of at least 5 sec.

4. The method of claim 1 wherein the multi-exposures are double-exposures comprising two respective images captured by two respective cameras.

5. The method of claim 1, wherein said detecting included detecting at least one moving object not suspected to be in said each multi-exposure prior to said detecting.

6. A moving object detection system, comprising:
   (a) an optical unit comprising at least one camera for capturing images of scenes;
   (b) an airborne electronics unit comprising:
       (i) a controller coupled with said optical unit for controlling fields of view and image capture times of said at least one camera, wherein said controller controls said at least one camera to capture a time series of multi-exposures of scenes, each multi-exposure of a scene comprising a sequence of at least two at least partially overlapping images of that scene captured in rapid succession, wherein the time series of multi-exposures periodically revisits substantially the same scenes; and
       (ii) a moving object detector coupled with said optical unit for detecting moving objects within each multi-exposure by comparing its sequence of overlapping images and for generating data characterizing the moving objects;
   (c) an airborne transmitter for transmitting only the data characterizing the moving objects from the airborne vehicle to a ground station via a communication link; and
   (d) at the ground station: a ground processing unit communicatively coupled with said first electronics unit for tracking the moving objects based on the data characterizing the moving objects;
   wherein the data characterizing the moving objects comprises, for each moving object, a capture time, object location coordinates, an object velocity vector, and a thumbnail image of the object.

7. The moving object detection system of claim 6 wherein said airborne transmitter transmits data at low bit rate.

8. The moving object detection system of claim 6 wherein said controller controls said at least one camera so as to capture the at least two overlapping images of the scene within time intervals of 0.1-0.5 sec.

9. The moving object detection system of claim 6 wherein said controller controls said at least one camera so as to revisit the same scene with a period of at least 5 sec.

10. The moving object detection system of claim 6 wherein said at least one camera comprises two cameras, and wherein the multi-exposures are double-exposures comprising two respective images captured by said two respective cameras.

11. The moving object detection system of claim 6 wherein each of said at least one camera is mounted rotatably on a gimbal.

12. The moving object detection system of claim 6 further comprising means for controlling lines-of-sight of said at least one camera.

13. The moving object detection system of claim 6 wherein said moving object detector is for detecting moving objects not suspected to be in said each multi-exposure prior to said detecting.

* * * * *